(12) United States Patent
Zhou et al.

(10) Patent No.: US 9,829,974 B2
(45) Date of Patent: Nov. 28, 2017

(54) METHOD FOR CONTROLLING TRIGGERING OF HUMAN-COMPUTER INTERACTION OPERATION AND APPARATUS THEREOF

(71) Applicant: Tencent Technology (Shenzhen) Company Limited, Shenzhen, Guangdong (CN)

(72) Inventors: Bin Zhou, Guangdong (CN); Sen Sheng, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 68 days.

(21) Appl. No.: 14/750,697

(22) Filed: Jun. 25, 2015

(65) Prior Publication Data

US 2015/0293589 A1 Oct. 15, 2015

Related U.S. Application Data

(63) Continuation of application No. PCT/CN2013/087811, filed on Nov. 26, 2013.

(30) Foreign Application Priority Data

Dec. 28, 2012 (CN) .......................... 2012 1 0583819

(51) Int. Cl.
  *G06F 3/01* (2006.01)
  *G06T 7/00* (2017.01)
  (Continued)

(52) U.S. Cl.
  CPC ............ *G06F 3/013* (2013.01); *G06F 3/0304* (2013.01); *G06F 3/0425* (2013.01);
  (Continued)

(58) Field of Classification Search
  CPC ......... G06T 2207/10004; G06T 7/0085; G06T 7/004; G06T 7/0022; G06T 1/0007;
  (Continued)

(56) References Cited

U.S. PATENT DOCUMENTS

| | | | | |
|---|---|---|---|---|
| 6,191,773 B1* | 2/2001 | Maruno | ............. | H04N 21/4223 345/156 |
| 6,231,185 B1* | 5/2001 | Pipa | ........................ | G06T 7/004 351/208 |

(Continued)

FOREIGN PATENT DOCUMENTS

| | | |
|---|---|---|
| CN | 101291364 A | 10/2008 |
| CN | 101344919 A | 1/2009 |

(Continued)

OTHER PUBLICATIONS

International Search Report for corresponding International Application No. PCT/CN2013/087811, dated Mar. 6, 2014, 5 pages.

(Continued)

*Primary Examiner* — Sean Conner
*Assistant Examiner* — Pinalben Patel
(74) *Attorney, Agent, or Firm* — Brinks Gilson & Lione

(57) ABSTRACT

A method for controlling triggering of a human-computer interaction operation and an apparatus are provided according to the embodiments of the disclosure. The method includes: acquiring images shot by a shooting device, and displaying the acquired images on a display screen in a blurring manner; detecting a difference between acquired images in each frame, recognizing a designated outline on the image according to the difference between acquired images in each frame, and calculating a location of the recognized designated outline on the display screen; and determining, in real time, whether the designated outline at the location on the display screen intersects with a desig- (Continued)

nated area displayed on the display screen, and triggering an operation corresponding to the designated area if the designated outline at the location on the display screen intersects with the designated area displayed on the display screen.

17 Claims, 6 Drawing Sheets

(51) Int. Cl.
G06K 9/00 (2006.01)
G06T 1/00 (2006.01)
G06F 3/03 (2006.01)
G06F 3/042 (2006.01)
G06F 3/0484 (2013.01)
G06F 3/00 (2006.01)

(52) U.S. Cl.
CPC ..... *G06F 3/04842* (2013.01); *G06K 9/00335* (2013.01); *G06K 9/00604* (2013.01); *G06T 1/0007* (2013.01); *G06T 2207/10004* (2013.01); *G06T 2207/30201* (2013.01)

(58) Field of Classification Search
CPC ....... G06T 2207/30201; G06F 3/04842; G06F 3/013; G06F 3/0304; G06F 3/0425; G06K 9/00604
See application file for complete search history.

(56) References Cited

U.S. PATENT DOCUMENTS

| | | | | |
|---|---|---|---|---|
| 6,637,883 B1 * | 10/2003 | Tengshe | ................ | A61B 3/113 351/210 |
| 2006/0093998 A1 * | 5/2006 | Vertegaal | ................ | G06F 3/011 434/236 |
| 2009/0027337 A1 | 1/2009 | Hildreth | | |
| 2011/0234879 A1 * | 9/2011 | Kashitani | ................ | G06F 3/011 348/333.02 |
| 2012/0050273 A1 | 3/2012 | Yoo et al. | | |
| 2012/0256967 A1 * | 10/2012 | Baldwin | ................ | G06F 3/013 345/684 |
| 2015/0130740 A1 * | 5/2015 | Cederlund | .............. | G06F 3/014 345/173 |
| 2015/0346835 A1 | 12/2015 | Bell et al. | | |
| 2016/0038020 A1 * | 2/2016 | Narasimha-Iyer | ... | A61B 3/0091 351/212 |

FOREIGN PATENT DOCUMENTS

| | | | |
|---|---|---|---|
| CN | 101810003 A | | 8/2010 |
| CN | 101872244 A | | 10/2010 |
| CN | 101952818 A | | 1/2011 |
| CN | 102200881 A | | 9/2011 |
| CN | 102375542 A | | 3/2012 |
| CN | 102830797 A | * | 12/2012 |

OTHER PUBLICATIONS

Written Opinion of the International Searching Authority for corresponding International Application No. PCT/CN2013/087811, dated Mar. 6, 2014, 8 pages.

Office Action dated Mar. 9, 2017 for Chinese Application No. 201210583819.6, 9 pages.

* cited by examiner

METHOD FOR CONTROLLING TRIGGERING OF HUMAN-COMPUTER INTERACTION OPERATION AND APPARATUS THEREOF

CROSS REFERENCE TO RELATED APPLICATIONS

The application is a continuation application of International Application PCT/CN2013/087811 filed on Nov. 26, 2013, titled "TRIGGER AND CONTROL METHOD AND SYSTEM FOR HUMAN-COMPUTER INTERACTION OPERATION", which claims priority to Chinese Patent Application No. 201210583819.6, filed on Dec. 28, 2012 with the Chinese Patent Office, titled "METHOD FOR CONTROLLING TRIGGERING OF HUMAN-COMPUTER INTERACTION OPERATION AND APPARATUS THEREOF", both of which are incorporated herein by reference in their entireties.

TECHNICAL FIELD

The disclosure relates to the field of human-computer interaction techniques of a computer, and in particular, to a method for controlling triggering of a human-computer interaction operation and an apparatus thereof.

BACKGROUND

Human-computer interaction techniques refer to technologies for effectively achieving human-computer dialogues by means of input devices and output devices of a computer. These technologies include: providing, by a computer, a large amount of relevant information, prompts, requests, and the like for human by means of output devices or display devices, and inputting, by human, relevant information, operation instructions, and answers for questions, or the like for the computer by means of input devices. The human-computer interaction techniques are playing an important role in designing user interface of a computer.

In the conventional human-computer interaction techniques, in case that relevant information is input by human into a computer by means of input devices, operations are generally performed by hands. For example, the input device may be a keyboard, a mouse or a touch screen, etc. Relevant instruction information is input by human by using a keyboard, and the computer may respond to the instruction information and perform a corresponding operation; alternatively, a relevant button on a computer interface may be clicked by human by using a mouse to input the instruction, and the computer may respond to the instruction and perform a corresponding operation. For example, a "close" button is clicked by human by using a mouse, and the computer closes a window corresponding to the "close" button.

SUMMARY

A method for controlling triggering of a human-computer interaction operation and an apparatus thereof are provided according to embodiments of the disclosure, to facilitate the disabled to trigger a computer operation in a contactless manner.

A method for controlling triggering of a human-computer interaction operation is provided, which includes:

acquiring images shot by a shooting device, and displaying the acquired images on a display screen in a blurring manner;

detecting a difference between the acquired images in each frame, recognizing a designated outline on the acquired image according to the difference between the acquired images in each frame, and calculating a location of the recognized designated outline on the display screen; and determining, in real time, whether the designated outline at the location on the display screen intersects with a designated area displayed on the display screen, and triggering an operation corresponding to the designated area if the designated outline at the location on the display screen intersects with the designated area displayed on the display screen.

An apparatus for controlling triggering of a human-computer interaction operation is provided, which includes at least one processor and a memory having processor-executable instructions stored therein, and the instructions when executed by the at least one processor, configure the apparatus to:

acquire images shot by a shooting device, and display the acquired images on a display screen in a blurring manner;

detect a difference between the acquired images in each frame, recognize a designated outline on the image according to the difference between the acquired images in each frame, and calculate a location of the recognized designated outline on the display screen; and determine, in real time, whether the designated outline at the location on the display screen intersects with a designated area displayed on the display screen, and trigger an operation corresponding to the designated area if the designated outline at the location on the display screen intersects with the designated area displayed on the display screen.

It can be seen that in the embodiments of the disclosure, the images shot by the shooting device are acquired; the images are displayed on the display screen in the blurring manner such as in a translucent manner, so that the images may superimpose other interface displayed on the display screen, and the designated outline (for example, an outline of an organ such as an eye of human or a mouth of human) on the image can be recognized; and a user may control movement of the designated outline on the image by moving his body, and in case that the designated outline intersects with the designated area (which, for example, may be a display area for media information, or a designated instruction area such as a button or a link, etc) displayed on the display screen, the operation corresponding to the designated area is triggered. Therefore, the human-computer interaction operation may be triggered without using hands, which facilitates those with disabled hands to trigger a computer operation in a contactless manner.

BRIEF DESCRIPTION OF THE DRAWINGS

The following drawings are some embodiments of the technical solutions of the present disclosure, and embodiments of the present disclosure are not limited to the features shown in the drawings. In the following drawings, similar reference signs represent similar elements.

DETAILED DESCRIPTION OF EMBODIMENTS

Figure 1:
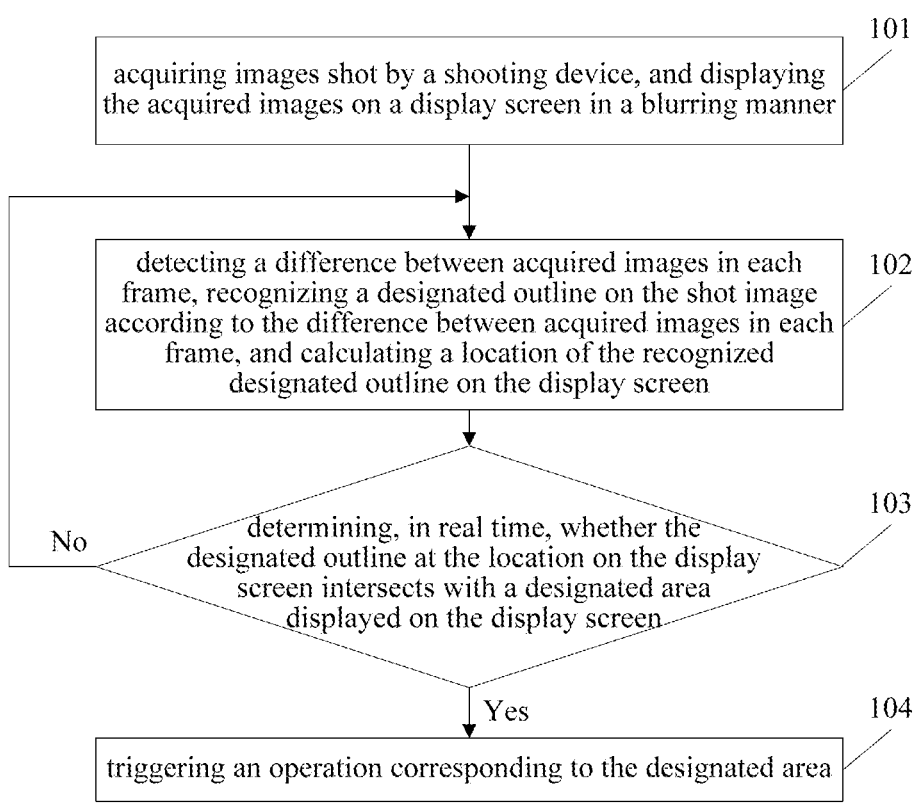
FIG. 1 is a schematic flowchart of a method for controlling triggering of a human-computer interaction operation according to an embodiment of the disclosure.

The disclosure is further described below in detail in combination with the drawings and specific embodiments.

Throughout the descriptions of the embodiments, the term "shooting device" may alternately be described as "an image acquisition device" (such as a fixed image camera or a video camera).

For simple and intuitive description, the solutions of the disclosure are illustrated below by describing some representative embodiments. A large number of details in the embodiments are merely used to help understanding the solutions of the disclosure. Obviously, implementation of the technical solutions of the disclosure may not be limited to these details. In order to avoid unnecessarily obscuring the solutions of the disclosure, some embodiments are not described in detail, and only frameworks are given in these embodiments. In the following, "include" refers to "include, but is not limited to", and "according to . . . " refers to "at least according to . . . ", but is not limited to "only according to . . . " Due to Chinese customary language usage, hereinafter in case if a certain type of component is not defined, it may be understood that there may be at least one or more components of this type.

Currently, it is widely accepted that a human-computer interaction operation is performed by hands, however, for those with disabled hands, the technology, in which information and instruction are input into a computer by operations of hands and thus the human-computer interaction operation can not be achieved in a contactless manner, is inappropriate. Although there is a technical solution, in which contactless input in human-computer interaction is performed by hand gestures, but corresponding actions need to be performed by hands in this technical solution, which is still inconvenient for those with disabled hands.

A method for controlling triggering of a human-computer interaction operation and an apparatus thereof are provided according to embodiments of the disclosure. In the embodiments of the disclosure, images shot by a shooting device are acquired, and the images are displayed on a display screen in a blurring manner; difference between the images in each frame is detected, a designated outline on the shot image is recognized according to the difference between the images in each frame, and a location of the recognized designated outline on the display screen is calculated; and whether the designated outline at the location on the display screen intersects with a designated area displayed on the display screen is determined in real time, and an operation corresponding to the designated area is triggered if the designated outline at the location on the display screen intersects with the designated area displayed on the display screen. In the embodiments of the disclosure, the human-computer interaction operation may be triggered without using hands, which facilitates those with disabled hands to trigger a computer operation in the contactless manner.

FIG. 1 is a schematic flowchart of a method for controlling triggering of a human-computer interaction operation according to an embodiment of the disclosure. As shown in FIG. 1, the method mainly includes step 101 to step 104.

Step 101 includes: acquiring images shot by a shooting device, and displaying the images on a display screen in a blurring manner.

The blurring manner may be a designated display manner, such as a translucent display manner. For example, the images are displayed on the display screen in the translucent manner; or the images may be converted into animated outline images (for example, animated images with simple outlines), and the animated outline images may be superimposed to an original interface of the display screen, so that a user may see the original interface of the display screen, and the animated outline images, which facilitates the user to perform subsequent operations by moving the images. In the following embodiments, the case that the images are displayed on the display screen in the translucent manner is taken as an example for illustration.

Step 102 includes: detecting difference between images in each frame, recognizing a designated outline on the shot image according to the difference between images in each frame, and calculating a location of the recognized designated outline on the display screen.

Step 103 includes: determining, in real time, whether the designated outline at the location on the display screen intersects with a designated area displayed on the display screen, and proceeding to step 104 if the designated outline at the location on the display screen intersects with the designated area displayed on the display screen, and returning to step 102 if the designated outline at the location on the display screen does not intersect with the designated area displayed on the display screen.

Step 104 includes: triggering an operation corresponding to the designated area.

In this embodiment of the disclosure, the recognizing a designated outline on the image may be recognizing an outline of a human organ, or may alternatively be recognizing an outline of other pattern. Generally, a shooting device (such as a camera) installed in an apparatus such as a computer shoots a head of a user. For example, in case that the user performs a video chat by using a video chatting tool, the shooting device generally shoots images of the head of the user, especially, facial images. Therefore, in order to facilitate operations of users, especially, those with disabled hands, in an embodiment of the disclosure, the recognizing a designated outline on the image may be recognizing an outline of a human eye, since the human eye has a standard outline, and further operation instructions may be sent to a computer by further detecting a motion form such as a blink.

The recognized designated outline on the image may alternatively be an outline of a human organ such as a mouth, and even may alternatively be a designated standard pattern. For example, a white board painted with the designated pattern may be provided for the user in advance, the user may lift the white board in front of the camera so that the camera shoots the designated pattern (such as an ellipse with a clear outline) on the white board, and the designated pattern is the designated outline to be detected in this embodiment of the disclosure. In case that the user moves the white board so that the designated pattern displayed on the display screen intersects with the designated area (which, for example, may be a display area of media information, or a designated instruction area such as a button or a link, etc), the operation corresponding to the designated area is triggered. In this way, the human-computer interaction operation may be achieved without using hands, thereby facilitating those with disabled hands to trigger a computer operation in a contactless manner.

The case that the designated outline is an outline of an eye is taken as an example for illustration in the following embodiments of the disclosure.

In step 102, the process of detecting difference between images in each frame, recognizing a designated outline on the shot image according to the difference between images in each frame, and calculating a location of the recognized designated outline on the display screen may be achieved by using a programming tool, for example, by using a targeted interface function in an open source computer vision library (openCV).

The OpenCV is a cross-platform computer vision library distributed based on an open source, and may run on a computer operating system such as Linux, Windows, or Mac OS. The OpenCV is lightweight and efficient, is formed by a series of C functions and a small number of C++ classes, provides invocation interfaces of languages such as Python, Ruby, and MATLAB, and implements many universal calculation methods in image processing and computer vision.

For example, in an embodiment, the difference between the images in each frame may be detected by using a cvSub interface function and a cyThreshold interface function in the OpenCV. For example, instructions of specific implementation code are as follows:

cvSub(gray, prev, diff, NULL);
cvThreshold(diff, diff, 5, 255, CV_THRESH_BINARY).

The gray is a current frame of the image, the prev is a previous frame of the current frame, and the diff is the difference between images in each frame.

For example, in an embodiment, the designated outline may be recognized according to the difference between images in each frame by using a cvFindContour interface function in the OpenCV, for example, recognizing the eye outline. For example, specific instructions of implementation code are as follows:

```
int nc = cvFindContours(
    diff,           /* the difference image */
    storage,        /* created with cvCreateMemStorage( ) */
    &comp,          /* output: connected components */
    sizeof(CvContour),
    CV_RETR_CCOMP,
    CV_CHAIN_APPROX_SIMPLE,
    cvPoint(0,0)
).
```

The diff is the calculated difference between images in each frame; the comp is the recognized eye outline, and the eye outline is output by the cvFindContour interface function.

For example, in an embodiment, the location of the recognized designated outline on the display screen may be calculated by using a cvSetImageROI interface function in the OpenCV, a specific implementation code instruction of which is as follows:

cvSetImageROI(gray, rect_eye).

The rect_eye is a location of the eye outline output by the interface function cvSetImageROI on the image in the current frame gray, and a current location of the eye outline on the display screen may be calculated according to a location occupied by the image in the current frame gray on the display screen.

In this embodiment of the disclosure, the designated area displayed on the display screen may have multiple forms. For example, the designated area may be a display area of electronic media information (referred as media information in the embodiments of the disclosure), and may alternatively be the designated instruction area such as a designated button, a designated word link, a designated picture area, etc.

Figure 2A:
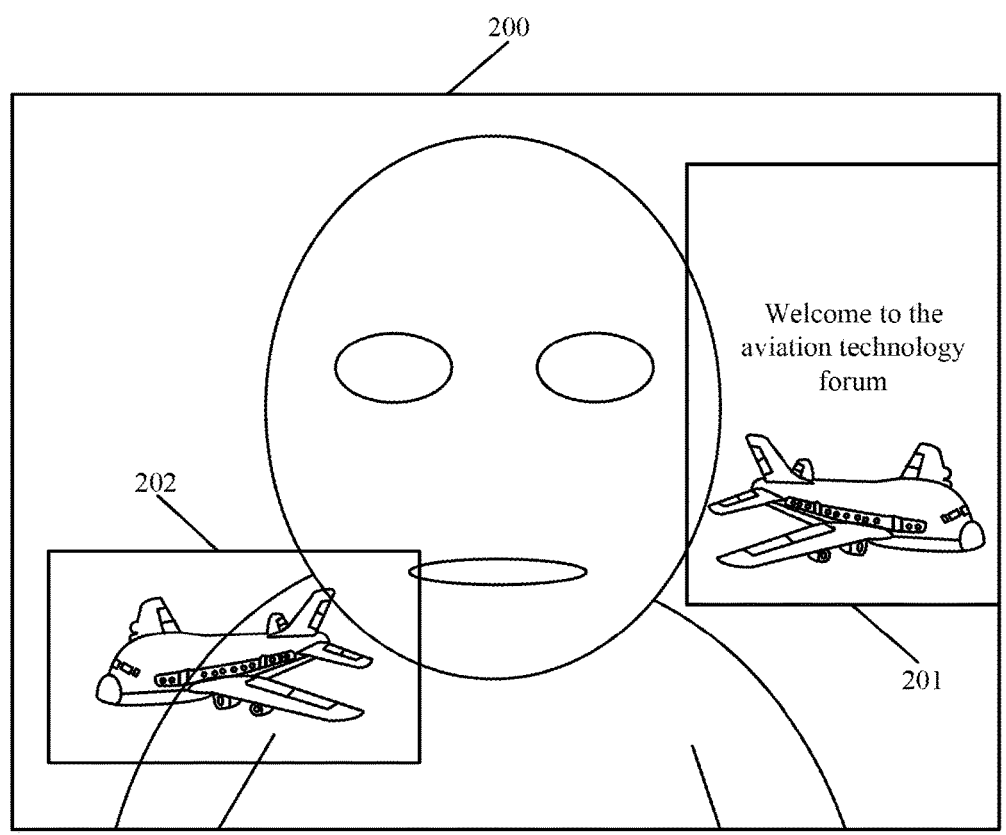
FIG. 2a is a schematic diagram of a first computer interface on which a designated area displayed on a display screen is a display area of designated media information according to an embodiment of the disclosure.
Figure 2B:
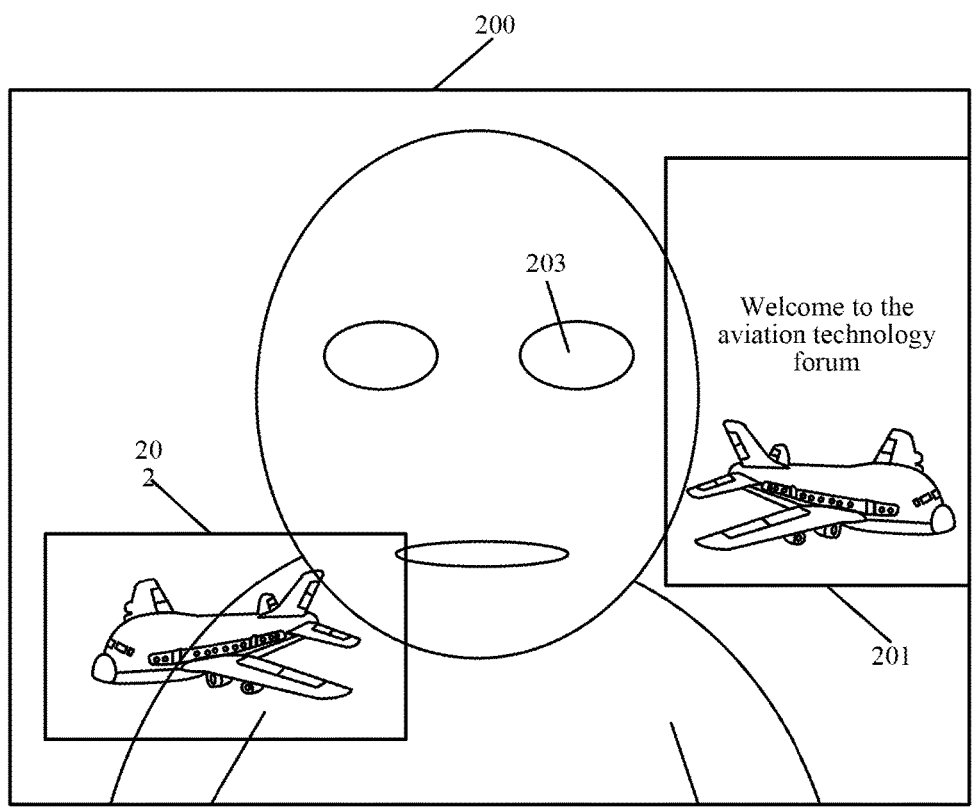
FIG. 2b is a schematic diagram of a second computer interface on which a designated area displayed on a display screen is a display area of designated media information according to an embodiment of the disclosure.

FIG. 2a is a schematic diagram of a first computer interface on which a designated area displayed on a display screen is a display area of designated media information. As shown in FIG. 2a, media information 201 and media information 202 are displayed on the computer interface 200. In this embodiment of the disclosure, a head of a user shot by a shooting device is displayed on the computer interface 200 in a translucent manner. In this way, the head of the user may superimpose information on the computer interface 200, so that the user may not only see a variety of information on the interface 200 clearly, but also see his head. Thus the user may observe movement of the eye outline while moving his head, so that the eye outline can move to the designated area, i.e., a display area of the media information 201 or a display area of the media information 202. FIG. 2b is a schematic diagram of a second computer interface on which a designated area displayed on a display screen is a display area of designated media information. As shown in FIG. 2b, in case that an eye outline 203 of a user moves to the display area of the designated media information 201, that is, the eye outline 203 on the display screen intersects with the display area of the media information 201, an operation corresponding to the display area of the designated media information 201 is triggered.

In an embodiment, in case that the designated outline such as the eye outline 203 on the display screen intersects with the designated area displayed on the display screen, such as the display area of the media information 201, the triggered operation corresponding to the display area of the designated media information 201 includes: recording a period of time in which the eye outline 203 intersects with the display area of the designated media information 201, determining whether the eye outline 203 on the display screen moves out of the display area of the designated media information 201, stopping recording the period of time if the eye outline 203 on the display screen moves out of the display area of the designated media information 201, and continuing recording the period of time if the eye outline 203 on the display screen does not move out of the display area of the designated media information 201. In this way, degree of concern of the user on the media information 201 may be calculated based on the period of time, and other relevant operation such as a billing operation may be further performed according to the degree of concern. That is, billing information corresponding to the designated media information 201 is calculated according to the recorded period of time in which the designated outline (such as the eye outline 203) intersects with the display area of the designated media information 201.

Generally, for media information (for example, web advertisements are a kind of media information) presented on networks, billing is performed based on clicks of users on the media information and the number of times of exposures of the media information, rather than based on length of time that visitors view the media information. According to above processing steps in the embodiment of the disclosure, the period of time that the eye outline of the user intersects with the designated media information, equivalent to degree of concern of the user on the media information, may be calculated, on the basis of which a new way for billing the media information may be achieved. For example, as shown in FIG. 2b, timing is started once the visitor moves his head to make an eye outline 203 of the visitor displayed on the display screen intersect with the display area of the designated media information 201, timing is stopped once the eye outline 203 on the display screen moves out of the display area of the designated media information 201, and billing on the media information 201 is started if the period of time exceeds predetermined number of seconds, so that the media information may be billed based on the degree of concern of the user on the media information, and thus the billing may be more specific and more accurate.

In another embodiment, in case that the designated outline on the display screen intersects with the designated area displayed on the display screen, the triggered operation corresponding to the display area of the designated media information includes: detecting whether a designated motion form of the designated outline occurs, and triggering an instruction operation bound with the designated area if the designated motion form of the designated outline occurs. For example, whether the eye outline 203 blinks is detected, and the instruction operation bound with the designated area is triggered if the eye outline 203 blinks. For example, the instruction operation bound with the designated media information 201 is a click. The click on the media information 201 may be triggered after the user blinks, thereby opening a web page to which the media information 201 is directed.

Figure 3A:
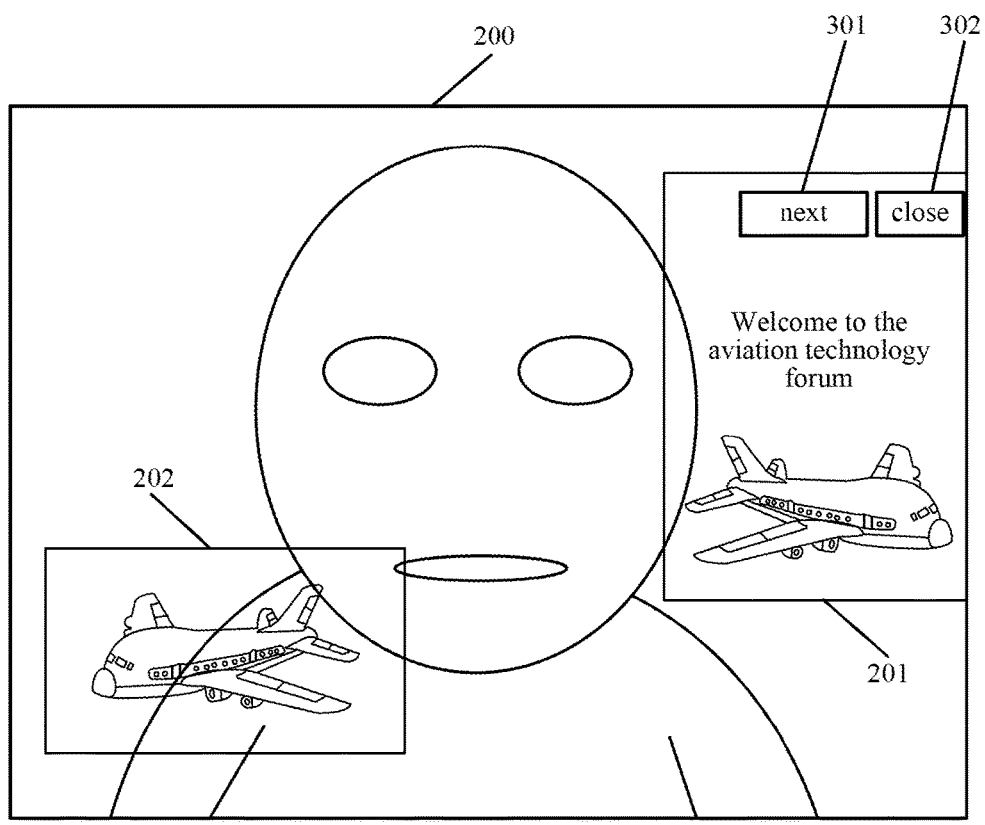
FIG. 3a is a schematic diagram of a first computer interface on which a designated area displayed on a display screen is a designated instruction area according to an embodiment of the disclosure.

FIG. 3a is a schematic diagram of a first computer interface on which a designated area displayed on a display screen is a designated instruction area. As shown in FIG. 3a, media information 201 and media information 202 are displayed on the computer interface 200. There is also a designated instruction area on the media information 201. For example, a "next" button 301 and a "close" button 302 are both designated instruction areas. The instruction operation bound with the "next" button 301 is to switch the current media information 201 to next media information, and an instruction operation bound with the "close" button 302 is to close the current media information 201. In this embodiment of the disclosure, a head of a user shot by a shooting device is displayed on the computer interface 200 in a translucent manner. In this way, the head of the user may superimpose information on the computer interface 200, so that the user may not only see a variety of information clearly, but also see his head, on the interface 200. Thus the user can observe movement of the eye outline while moving his head, so that the eye outline can move to the designated instruction area.

Figure 3B:
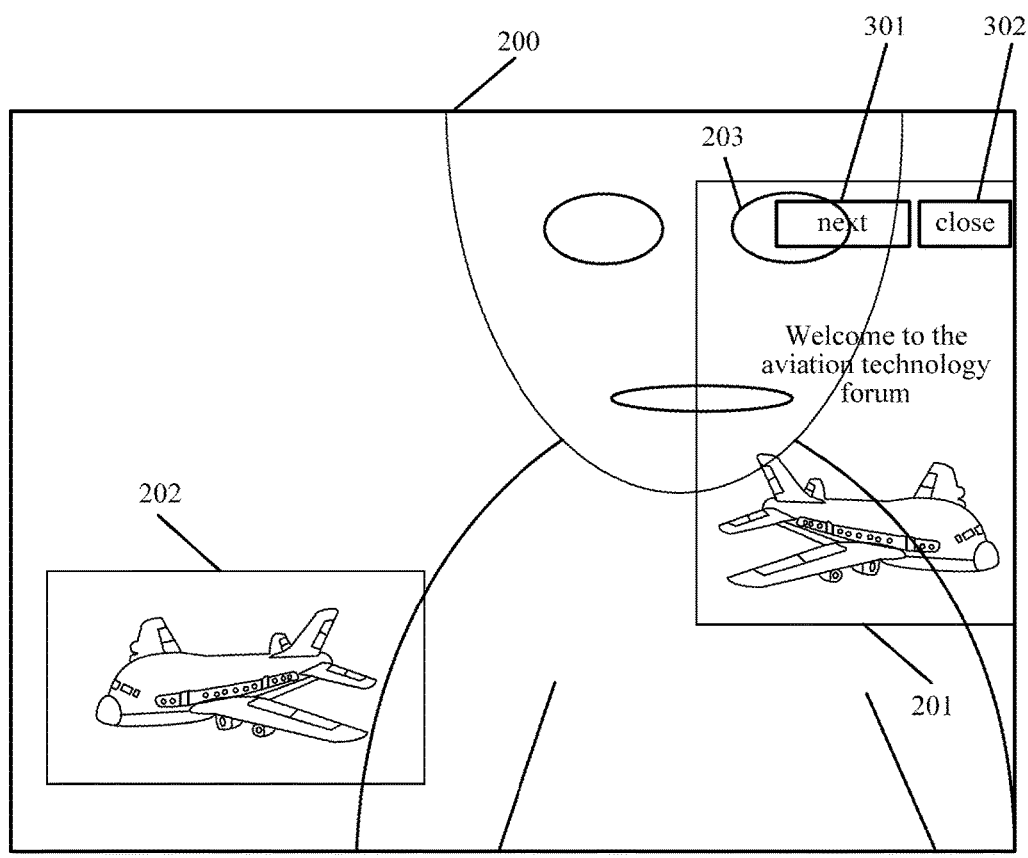
FIG. 3b is a schematic diagram of a second computer interface on which a designated area displayed on a display screen is a designated instruction area according to an embodiment of the disclosure.

FIG. 3b is a schematic diagram of a second computer interface on which a designated area displayed on a display screen is a designated instruction area. In case that an eye outline 203 of a user moves to the "next" button 301, that is, the eye outline 203 intersects with the "next" button 301, whether a designated motion form (such as blinking) of the eye outline 203 occurs is detected. If the designated motion form of the eye outline 203 occurs, an instruction operation bound with the "next" button 301 is triggered, that is, the current media information 201 displayed on the display area of the media information is switched to next media information. In case that the eye outline 203 of the user moves to the "close" button 302, that is, the eye outline 203 intersects with the "close" button 302, whether a designated motion form (such as blinking) of the eye outline 203 occurs may be detected. If the designated motion form of the eye outline 203 occurs, an instruction operation bound with the "close" button 302 is triggered, that is, the current media information 201 is closed.

In other embodiment, in case that the designated outline is an outline of other pattern, the designated motion form may be an action corresponding to the outline of other pattern. For example, in case that the designated outline is an outline of a human mouth, the designated motion form may be opening and closing actions of the mouth.

In an embodiment, the process of detecting whether a designated motion form of the designated outline occurs includes:

creating a template of the designated outline, for example, in an embodiment, creating an eye template by using a cvResetImageROI(gray) interface function in an OpenCV;

detecting images in each frame in the template (such as the eye template) of the designated outline, determining whether change between the images in each frame satisfies the designated motion form and triggering the instruction operation bound with the designated area if the change between the images in each frame satisfies the designated motion form.

For example, in case that the designated outline is the eye outline, the process of detecting whether a designated motion form of the designated outline occurs may include: detecting whether the eye outline blinks.

A specific method of detecting whether the outline of an eye blinks may include: detecting boundary values of the eye outline; detecting a maximum value and a minimum value of the boundary values; and detecting whether a difference between the maximum value and the minimum value of the boundary values decreases and then increases, and determining that the eye outline blinks if the difference between the maximum value and the minimum value of the boundary values decreases and then increases.

For example, in an embodiment, whether the eye outline blinks may be determined by using a relevant interface function in the OpenCV, a specific method of which may include the following steps 411 to 413.

Step 411 includes: detecting a boundary of the eye outline according to a cvMatchTemplate interface function, a specific code instruction of which is as follows:

cvMatchTemplate(img, tpl, tm, CV_TM_CCOEFF_NORMED).

The tpl is an eye template created by using the cvResetImageROI(gray) interface function.

Step 412 includes: detecting, by the cvMinMaxLoc interface function, a maximum value and a minimum value of boundary values of the eye outline, a specific code instruction of which is as follows:

cvMinMaxLoc(tm, &minval, &maxval, &minloc, &maxloc, 0).

Step 413 includes: detecting whether a difference between the maximum value and the minimum value of the boundary values of the eye outline decreases and then increases, that is, determining whether the eye closes, and determining that the eye outline blinks if the difference between the maximum value and the minimum value of the boundary values of the eye outline decreases and then increases, specific code instructions of which are as follows:

```
if (maxval < TE_THRESHOLD)
return 0;
// return the search window
*window = win;
// return eye location
*eye = cvRect(
win.x + maxloc.x,
win.y + maxloc.y,
TPL_WIDTH,
TPL_HEIGHT
);
if ((maxval > LB_THRESHOLD) && (maxval < UB_THRESHOLD))
``` return 2; //close the eye, which is a code instruction of detecting the process that the difference between the maximum value and the minimum value of the boundary values of the eye outline decreases.

if (maxval>OE_THRESHOLD)

return 1; //open the eye, which is a code instruction of detecting the process that the difference between the maximum value and the minimum value of the boundary values of the eye outline increases.

For example, in a specific application scenario, in case that the user is having a chat by using an instant communication tool of online video, in this embodiment of the disclosure, images shot by a camera may be displayed in a blurring manner. For example, an image of a head of the user shot by a camera is displayed in a video chatting picture in the blurring manner, and a web advertisement (i.e., the media information) is presented in the video chatting picture, where the web advertisement may display advertisement content and may display a "next" button and a "close" button. In case that the head of the user moves, and the eye outline moves to the "next" button, the current web advertisement may be switched to a next web advertisement; and in case that the eye outline moves to the "close" button, the web advertisement may be closed. Meanwhile, the web advertisement may be billed according to the period of time in which the eye outline intersects with the web advertisement.

Figure 4:
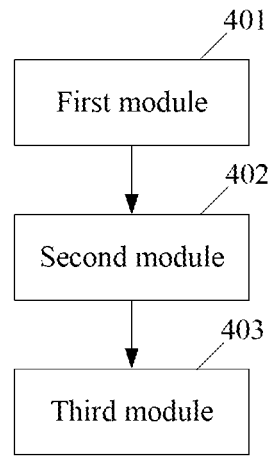
FIG. 4 is a schematic composition diagram of an apparatus for controlling triggering of a human-computer interaction operation according to an embodiment of the disclosure.

Corresponding to the foregoing method, an apparatus for controlling triggering of a human-computer interaction operation is further provided according to the embodiments of the disclosure, to perform the foregoing method. The apparatus may be realized by a computer device. The computer device may be a personal computer, a server, or a portable computer (such as a notebook computer or a tablet computer, etc). The computer device may include at least one processor and a memory. The memory stores computer readable instructions, and all or part of the processes in the foregoing method embodiments of the disclosure may be implemented through executing the computer readable instructions by the processor. The memory may be a magnetic disk, an optical disc, a read-only memory (ROM or a random access memory (RAM), etc. FIG. 4 is a schematic composition diagram of an apparatus for controlling of triggering of a human-computer interaction operation according to an embodiment of the disclosure. As shown in FIG. 4, the apparatus may include:

a first module 401, configured to acquire images shot by a shooting device, and display the images on a display screen in a translucent manner;

a second module 402, configured to detect difference between images in each frame, recognize a designated outline on the shot image according to the difference between images in each frame, and calculate a location of the recognized designated outline on the display screen; and a third module 403, configured to determine, in real time, whether the designated outline at the location on the display screen intersects with a designated area displayed on the display screen, and trigger an operation corresponding to the designated area if the designated outline at the location on the display screen intersects with the designated area displayed on the display screen.

In an embodiment, the third module 403 is specifically configured to determine, in real time, whether the designated outline at the location on the display screen intersects with the designated area displayed on the display screen, and trigger the operation corresponding to the designated area if the designated outline on the display screen intersects with the designated area displayed on the display screen, where the triggered operation includes: recording a period of time in which the designated outline intersects with the designated area, determining whether the designated outline on the display screen moves out of the designated area, stopping recording the period of time if the designated outline on the display screen moves out of the designated area, and continuing recording the period of time if the designated outline on the display screen does not move out of the designated area. A billing operation may be further performed on the designated area according to the period of time.

In another embodiment, the third module 403 is specifically configured to: determine, in real time, whether the designated outline at the location on the display screen intersects with the designated area displayed on the display screen, and trigger the operation corresponding to the designated area if the designated outline at the location on the display screen intersects with the designated area displayed on the display screen, where the triggered operation includes: detecting whether a designated motion form of the designated outline occurs, and triggering an instruction operation bound with the designated area if the designated motion form of the designated outline occurs.

In still another embodiment, the designated outline is an eye outline, and the third module 403 detects whether the designated motion form of the designated outline occurs, which specifically is: detecting whether the eye outline blinks.

The designated outline may alternatively be an outline of other pattern, such as an outline of a human mouth. In this case, the designated motion form may be opening and closing actions of a mouth.

In yet another embodiment, the designated area displayed on the display screen may be a display area of designated media information, a designated instruction area, or an area of other designated display form.

The modules according to the embodiments of the disclosure may be realized by software (for example, a computer readable instruction which is stored in a computer readable medium and executed by a processor), by hardware (for example, a processor of an application specific integrated circuit (ASIC)), or by a combination of software and hardware, which is not limited in the embodiments of the disclosure.

The modules according to the embodiments of the disclosure may be integrated, deployed separately, combined as one module, or further divided into multiple sub-modules.

Figure 5:
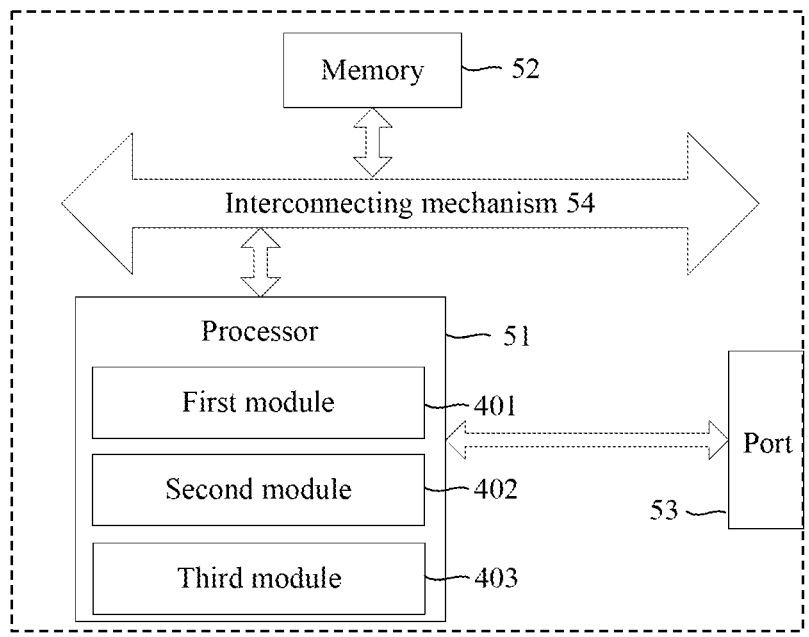
FIG. 5 is a schematic hardware diagram of an apparatus for controlling triggering of a human-computer interaction operation according to an embodiment of the disclosure.

FIG. 5 is a schematic hardware diagram of an apparatus for controlling triggering of a human-computer interaction operation according to an embodiment of the disclosure. As shown in FIG. 5, the apparatus may include: a processor 51, a memory 52, at least one port 53, and an interconnecting mechanism 54. The processor 51 and the memory 52 are connected via the interconnecting mechanism 54. The apparatus may receive and send data information via the port 53, where the memory 52 stores a computer readable instruction, the processor 51 executes the computer readable instruction to perform the following operations:

acquiring images shot by a shooting device, and displaying the images on a display screen in a blurring manner;

detecting difference between the images in each frame, recognizing a designated outline on the shot image according to the difference between the images in each frame, and calculating a location of the recognized designated outline on the display screen; and determining, in real time, whether the designated outline at the location on the display screen intersects with a designated area displayed on the display screen, and triggering an operation corresponding to the designated area if the designated outline at the location on the display screen intersects with the designated area displayed on the display screen.

In this embodiment of the disclosure, the processor 51 may execute the computer readable instruction stored in the memory 52 to further perform all or part of processes according to the foregoing method embodiments, which is not described herein.

It can be seen that in case that the computer readable instruction stored in the memory 52 is executed by the processor 51, functions of the first module 401, the second module 402, and the third module 401 described above may be achieved.

It can be seen that in the embodiments of the disclosure, the images shot by the shooting device are acquired; the images are displayed on the display screen in the blurring manner such as in a translucent manner, so that the images may superimpose other interface displayed on the display screen, and the designated outline (for example, an outline of an organ such as an eye of human and a mouth of human) on the image can be recognized; and a user may control movement of the designated outline on the image by moving his body, and in case that the designated outline intersects with the designated area (which, for example, may be a display area for media information, or a designated instruction area such as a button or a link, etc) displayed on the display screen, the operation corresponding to the designated area is triggered. Therefore, the human-computer interaction operation may be triggered without using hands, which facilitates those with disabled hands to trigger a computer operation in a contactless manner.

It should be noted that not all of the steps and modules in the foregoing processes and structural diagrams are necessary, and some steps or modules may be omitted as needed. The steps may be performed in different orders, which may be adjusted as needed. The modules are distinguished by function only for easy description. In actual implementation, one module can be implemented by multiple modules, and functions of multiple modules can be implemented by one module. The modules may be arranged in one device or arranged in different devices.

Hardware modules in the embodiments of the disclosure may be realized in a mechanical manner or an electronic manner. For example, a hardware module may include a specially designed permanent circuit or a logic device (for example, an application specific processor such as an FPGA or an ASIC) to achieve a specific operation. The hardware module may alternatively include a programmable logic device or a circuit (for example, include a universal processor or other programmable processor) which is configured by software to perform specific operations. In the mechanical manner, the hardware module is realized by using the application-specific permanent circuit, or using the temporarily configured circuit (for example, configured by software), which may be decided by taking account of costs and time.

Based on the foregoing descriptions of the embodiments, a person skilled in the art may clearly understand that the disclosure may be implemented by a combination of software and a necessary universal hardware platform, that is, the disclosure may be implemented by instructing related hardware by using computer readable instructions. The disclosure may also be implemented by hardware, however, the combination of software and hardware is a preferred embodiment in most cases. Based on such an understanding, the essence of the technical solutions of the disclosure, or the part of the technical solutions making contribution to the conventional technology may take a form of a software product. The computer software product is stored in a storage medium, includes a plurality of instructions, and is configured to enable a terminal device (which may be a mobile phone, a personal computer, a server, or a network device, etc) to perform the methods described in the embodiments of the disclosure.

A person of ordinary skill in the art may understand that all or part of the processes of the foregoing method embodiments may be achieved by instructing related hardware modules by using the computer readable instructions. The computer readable instructions may be stored in a computer readable storage medium, when executed by one or more processors on the terminal device, may cause the terminal device to execute the steps or functions in the described method. The processes of the foregoing method embodiments may be implemented by performing the computer readable instructions. The storage medium may be a magnetic disk, an optical disc, a read-only memory (ROM), or a random access memory (RAM), or in a cloud memory accessed via an Internet connection etc. Optionally, the computer readable instructions may be downloaded by a communication network from a server computer. The computer instructions may be hardware program codes modules constituted as logic gates microcodes within a ROM, a processor or a controller, or as functional modules constituted by both software/hardware together.

The foregoing descriptions are embodiments of the disclosure, but are not intended to limit the disclosure. Any modification, equivalent alternation, or improvement made within the spirit and principle of the disclosure shall fall within the protection scope of the disclosure. The scope of the claims of the disclosure should not be limited to the embodiments described above, and the specification as a whole should be explained with the widest scope.

The invention claimed is:

1. A method for controlling triggering of a human-computer interaction operation, comprising:

acquiring images shot by a shooting device, and displaying the acquired images on a display screen in a blurring manner;

detecting a difference between the acquired images in each frame, recognizing a designated outline on the acquired image according to the differences between the acquired images in each frame, and calculating a location of the recognized designated outline on the display screen;

determining, in real time, whether the designated outline at the location on the display screen intersects with a designated area displayed on the display screen, and triggering an operation corresponding to the designated area if the designated outline at the location on the display screen intersects with the designated area displayed on the display screen, wherein in case that the designated outline at the location on the display screen intersects with the designated area displayed on the display screen, the triggered operation corresponding to the designated area, comprising:
recording a period of time in which the designated outline intersects with the designated area;
determining whether the designated outline on the display screen moves out of the designated area;
stop recording the intersection time if the designated outline on the display screen moves out of the designated area, and continuing recording the period of time if the designated outline on the display screen does not move out of the designated area; and
calculating billing information corresponding to the designated area according to the recorded period of time in which the designated outline intersects with the designated area.

2. The method according to claim 1, wherein
in case that the designated outline at the location on the display screen intersects with the designated area displayed on the display screen, the triggered operation corresponding to the designated area, comprising:
detecting whether a designated motion form of the designated outline occurs; and
triggering an instruction operation bound with the designated area if the designated motion form of the designated outline occurs.

3. The method according to claim 2, wherein the process of detecting whether a designated motion form of the designated outline occurs, comprising:
creating a template of the designated outline;
detecting images in each frame in the template of the designated outline; and
determining whether a change between the acquired images in each frame satisfies the designated motion form, and triggering the instruction operation bound with the designated area if the change between the acquired images in each frame satisfies the designated motion form.

4. The method according to claim 2, wherein
the designated outline is an eye outline; and
the process of detecting whether a designated motion form of the designated outline occurs comprises:
detecting whether the eye outline blinks.

5. The method according to claim 3, wherein
the designated outline is an eye outline; and
the process of detecting whether a designated motion form of the designated outline occurs comprises:
detecting whether the eye outline blinks.

6. The method according to claim 4, wherein the process of detecting whether the eye outline blinks comprises:
detecting boundary values of the eye outline;
detecting a maximum value and a minimum value of the boundary values; and
detecting whether a difference between the maximum value and the minimum value of the boundary values decreases and then increases, and determining that the eye outline blinks if the difference between the maximum value and the minimum value of the boundary values decreases and then increases.

7. The method according to claim 5, wherein the process of detecting whether the eye outline blinks comprises:
detecting boundary values of the eye outline;
detecting a maximum value and a minimum value of the boundary values; and
detecting whether a difference between the maximum value and the minimum value of the boundary values decreases and then increases, and determining that the eye outline blinks if the difference between the maximum value and the minimum value of the boundary values decreases and then increases.

8. The method according to claim 1, wherein
the designated area displayed on the display screen is a display area of designated media information or a designated instruction area.

9. The method according to claim 1, wherein
the designated area displayed on the display screen is a display area of designated media information or a designated instruction area.

10. The method according to claim 1, wherein
the designated area displayed on the display screen is a display area of designated media information or a designated instruction area.

11. The method according to claim 2, wherein
the designated area displayed on the display screen is a display area of designated media information or a designated instruction area.

12. The method according to claim 3, wherein
the designated area displayed on the display screen is a display area of designated media information or a designated instruction area.

13. An apparatus for controlling triggering of a human-computer interaction operation, wherein the apparatus comprises at least one processor and a memory having processor-executable instructions stored therein, and the instructions when executed by the at least one processor, configure the apparatus to:
acquire images shot by a shooting device, and display the acquired images on a display screen in a blurring manner;
detect a difference between images in each frame, recognize a designated outline on the shot image according to the difference between acquired images in each frame, and calculate a location of the recognized designated outline on the display screen;
determine, in real time, whether the designated outline at the location on the display screen intersects with a designated area displayed on the display screen, and trigger an operation corresponding to the designated area if the designated outline at the location on the display screen intersects with the designated area displayed on the display screen, wherein the triggered operation comprises:
recording a period of time in which the designated outline intersects with the designated area,
determining whether the designated outline on the display screen moves out of the designated area, and
stopping recording the intersection time if the designated outline on the display screen moves out of the designated area, and continuing recording the period of time if the designated outline on the display screen does not move out of the designated area; and
calculate billing information corresponding to the designated area according to the recorded period of time in which the designated outline intersects with the designated area.

14. The apparatus according to claim 13, wherein the apparatus is further configured to:
trigger the operation corresponding to the designated area in case it is determined that the designated outline at the location on the display screen intersects with the designated area displayed on the display screen;
wherein the triggered operation comprises:
  detecting whether a designated motion form of the designated outline occurs, and
  triggering an instruction operation bound with the designated area, if the designated motion form of the designated outline occurs.

15. The apparatus according to claim 14, wherein the designated outline is an eye outline; and the apparatus is further configured to
  detect whether the eye outline blinks.

16. The apparatus according to claim 13, wherein the designated area displayed on the display screen comprises a display area of designated media information or a designated instruction area.

17. The apparatus according to claim 13, wherein the designated area displayed on the display screen comprises a display area of designated media information or a designated instruction area.

* * * * *